(12) United States Patent
Mo et al.

(10) Patent No.: US 12,703,274 B2
(45) Date of Patent: Aug. 11, 2026

(54) CHILD CARRIER, AND BUFFER ASSEMBLY FOR A SAFETY BELT

(71) Applicant: BAMBINO PREZIOSO SWITZERLAND AG, Steinhausen (CH)

(72) Inventors: Xiaolong Mo, Dongguan (CN); Zheng-wen Guo, Dongguan (CN)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 53 days.

(21) Appl. No.: 18/003,081

(22) PCT Filed: Jun. 29, 2021

(86) PCT No.: PCT/CN2021/103154
§ 371 (c)(1),
(2) Date: Dec. 22, 2022

(87) PCT Pub. No.: WO2022/002062
PCT Pub. Date: Jan. 6, 2022

(65) Prior Publication Data

US 2023/0242016 A1 Aug. 3, 2023
US 2025/0376091 A2 Dec. 11, 2025

(30) Foreign Application Priority Data

Jun. 30, 2020 (CN) ......................... 202021249273.7

(51) Int. Cl.
*B60N 2/28* (2006.01)

(52) U.S. Cl.
CPC ......... *B60N 2/2884* (2013.01); *B60N 2/2812* (2013.01); *B60N 2/2816* (2023.08)

(58) Field of Classification Search
CPC .. B60N 2/2884; B60N 2/2812; B60R 22/195; B60R 2022/021; B60R 2022/006
See application file for complete search history.

(56) References Cited

U.S. PATENT DOCUMENTS 7,513,532 B1 * 4/2009 Vaughns, Sr. ........... B60R 22/19
297/483
7,644,986 B2 * 1/2010 Berger ................. B60N 2/2812
297/484

(Continued)

FOREIGN PATENT DOCUMENTS

CN 1530266 A 9/2004
CN 101489827 A 7/2009

(Continued)

OTHER PUBLICATIONS

International Search Report issued in corresponding International Application No. PCT/CN2021/103154, dated Oct. 8, 2021, pp. 1-9, China National Intellectual Property Administration, Beijing, China.

(Continued)

*Primary Examiner* — Philip F Gabler
(74) *Attorney, Agent, or Firm* — HAUPTMAN HAM, LLP

(57) ABSTRACT

A child carrier having a carrier body for carrying a child; a safety belt connected to the carrier body) the safety belt being capable of restraining the child seated in the carrier body; and a buffer assembly connected to the carrier body and the safety belt, the buffer assembly configured to generate a buffering movement responsive to the child carrier being subjected to an impact or sudden deceleration. Responsive to the child carrier being subjected to an impact or sudden deceleration, the buffer assembly connected to the safety belt can generate a buffering movement under the action of inertia, thereby absorbing some of the energy of the (Continued)

impact or sudden deceleration and preventing the safety belt from exerting an excessive restraining and pulling force on the child.

19 Claims, 5 Drawing Sheets

(56) References Cited

U.S. PATENT DOCUMENTS 7,845,734 B2 * 12/2010 Gomi ...................... B60R 22/26 280/801.1
8,777,322 B2 * 7/2014 Horton ................. B60N 2/2851 297/484
8,991,935 B2 * 3/2015 Balensiefer .......... B60N 2/2884 297/470
9,327,679 B2 * 5/2016 Cheng .................... B60N 2/265
9,403,506 B2 * 8/2016 Denninger .............. B60R 22/28
9,643,765 B2 * 5/2017 Pivonka ............... B65D 63/109
9,714,002 B2 * 7/2017 Cheng ................ B60N 2/42709
11,273,790 B2 * 3/2022 Hamilton .............. B60R 21/055
2010/0293759 A1 * 11/2010 Wada ................. A62B 35/0031 267/136
2013/0169013 A1 * 7/2013 Carine ................. B60N 2/2809 297/254
2014/0021757 A1 1/2014 Mo
2014/0042793 A1 2/2014 Fiore
2019/0275983 A1 * 9/2019 Hamilton ................ B60R 22/30

FOREIGN PATENT DOCUMENTS

CN 102602308 A 7/2012
CN 105270216 A 1/2016
DE 102013214268 A1 2/2014
ES 1156858 U 5/2016
GB 2510684 A 8/2014
JP 2001328471 A 11/2001
JP 2005231453 A 9/2005
WO 2013170088 A1 11/2013

OTHER PUBLICATIONS

Extended European Search Report issued in European Patent Application No. 21834361.4; mailed Jun. 28, 2024; 8 pgs.

Extended Search Report in Corresponding European Application No. 26158473.4, dated Mar. 18, 2026; 8 pgs.

* cited by examiner

CHILD CARRIER, AND BUFFER ASSEMBLY FOR A SAFETY BELT

BACKGROUND

Field

One or more embodiments of the present invention relates to child carriers, in particular to child carriers including buffer assemblies.

Description of the Related Art

The use of child carriers is increasingly commonplace in daily lives. To ensure the child's safety, the seat of the child carrier generally has a safety belt system. The safety belt system of existing child carriers generally has a fixed end and another end fastened to a buckle of the seat for restraining a child. When the car in which the child safety seat is used is subjected to an impact or sudden deceleration, the action of inertia may have a substantial impact on the child, who may be displaced away from the safety seat. Because the existing safety belt is not elastically deformable, this action of inertia may result in the safety belt abruptly applying a significant pulling force on the child. As the skeleton of the child is not completely developed, the child may be easily injured by the abrupt pulling force exerted by the safety belt.

SUMMARY

An object of one or more embodiments of the present invention is to provide a buffer assembly suitable for use with a safety belt of a child carrier to prevent or minimize a child's injuries.

Another object of one or more embodiments of the present invention is to provide a child carrier that has a safety belt provided with a buffering function to prevent or minimize a child's injuries owing to inertia effects.

In order to achieve the above objectives, an embodiment of the present invention provides a child carrier comprising: a carrier body suitable for carrying a child; a safety belt connected to the carrier body, the safety belt suitable to restrain a child sitting in the carrier body; and a buffer assembly connected to the carrier body and the safety belt, wherein the buffer assembly is configured to generate a buffering movement responsive to the child carrier being subjected to an impact or sudden deceleration.

According to an embodiment, the buffer assembly connects to the carrier body at a location that differs from the location where the safety belt connects to the carrier body.

According to an embodiment, the buffer assembly connects to the carrier body at a location that is higher in elevation than the location where the safety belt connects to the carrier body.

According to an embodiment, the carrier body has a headrest portion, and the buffer assembly is connected to the headrest portion.

According to an embodiment, the buffer assembly is slidably connected to the safety belt.

According to an embodiment, the buffer assembly comprises a buffering part that is able to generate a buffering movement or to break.

According to an embodiment, the buffering part comprises a spring structure or an elastic flat structure, the flat structure being an elastic band or a rubber strip.

According to an embodiment, the buffer assembly further comprises a connecting strap that is connected to the buffering part and the safety belt.

According to an embodiment, the safety belt has a slidable protective piece, and the connecting strap is affixed to the protective piece.

According to an embodiment, a first anchoring end of the connecting strap is connected to the carrier body, a second anchoring end of the connecting strap is connected to the safety belt, and the buffering part is connected to the connecting strap between the first anchoring end and the second anchoring end thereof.

According to an embodiment, two ends of the buffering part are connected to the connecting strap at different corresponding locations.

According to an embodiment, the connecting strap is folded to form a loop between the first anchoring end and the second anchoring end, the loop being joined to be closed with the buffering part.

According to an embodiment, the buffering part is able to break upon application of a sufficient force by the connecting strap, which opens the loop and generates a buffering effect.

According to an embodiment, any of the carrier body and the safety belt is detachably connected to the buffer assembly.

According to an embodiment, the safety belt is a shoulder strap.

According to an embodiment, the carrier body is a child safety seat, an infant stroller, a cradle or a bassinet.

Moreover, another embodiment of the present invention provides a buffer assembly for use with a safety belt of a child carrier, two opposite ends of the buffer assembly being adapted to connect to a carrier body and the safety belt of the child carrier, wherein the buffer assembly is configured to generate a buffering movement when the child carrier is subjected to an impact or sudden deceleration.

According to an embodiment, the buffer assembly comprises a buffering part that is able to generate a buffering movement or to break.

According to an embodiment, the buffering part comprises a spring structure or an elastic flat structure, the flat structure being an elastic band or a rubber strip.

According to an embodiment, the buffer assembly further comprises a connecting strap that is connected to the buffering part.

According to an embodiment, the connecting strap has a first anchoring end adapted to connect to a carrier body, and a second anchoring end adapted to connect to a safety belt, and the buffering part is connected to the connecting strap between the first anchoring end and the second anchoring end thereof.

According to an embodiment, two ends of the buffering part are connected to the connecting strap at different corresponding locations.

According to an embodiment, the connecting strap is folded to form a loop between the first anchoring end and the second anchoring end, the loop being joined to be closed with the buffering part.

According to an embodiment, the buffering part is able to break upon application of a sufficient force by the connecting strap, which opens the loop and generates a buffering effect.

DETAILED DESCRIPTION OF THE EMBODIMENTS

Figure 1:
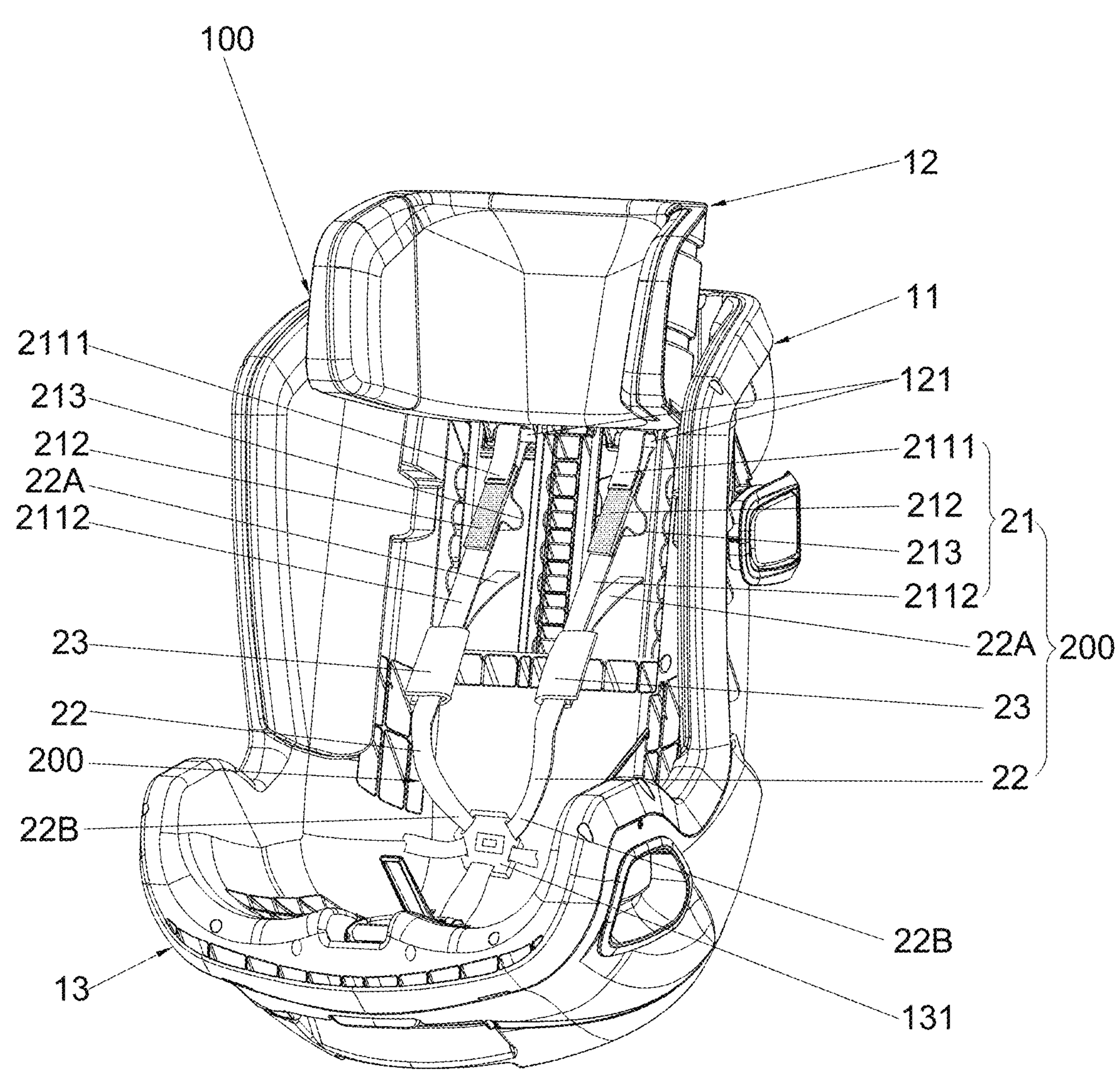
FIG. 1 is a schematic view illustrating a structure of a child carrier according to the present invention.

Referring to FIG. 1, a child carrier 1 comprises a carrier body 100 for carrying a child, and a safety belt system 200 for restraining the child. The safety belt system 200 is disposed on the carrier body 100. The safety belt system 200 has a safety belt 22 for restraining a child, and a buffer assembly 21 that is connected to the safety belt 22 and has a buffering function. The buffer assembly 21 is configured to generate a buffering movement responsive to the child carrier 1 being subjected to an impact or sudden deceleration so as to absorb a portion of the energy of the impact or sudden deceleration and thereby prevent or minimize the safety belt 22 from applying an excessive restraining or pulling force on the child. The carrier body 100 can be a child safety seat, an infant stroller, a cradle or a bassinet, and the buffer assembly 21 disposed therein may operate in a same way. The carrier body 100 described hereinafter is an example of a child safety seat for illustration.

Referring to FIG. 1, the carrier body 100 comprises a backrest portion 11, and a seat portion 13 connected to the backrest portion 11. Moreover, a headrest portion 12 is disposed on the backrest portion 11. The headrest portion 12 is slidably disposed on the backrest portion 11 so as to adapt to children of different body heights. Reference is made hereinafter to FIGS. 1-4 to describe a construction and operation of the safety belt system 200 and the buffer assembly 21.

Figure 2:
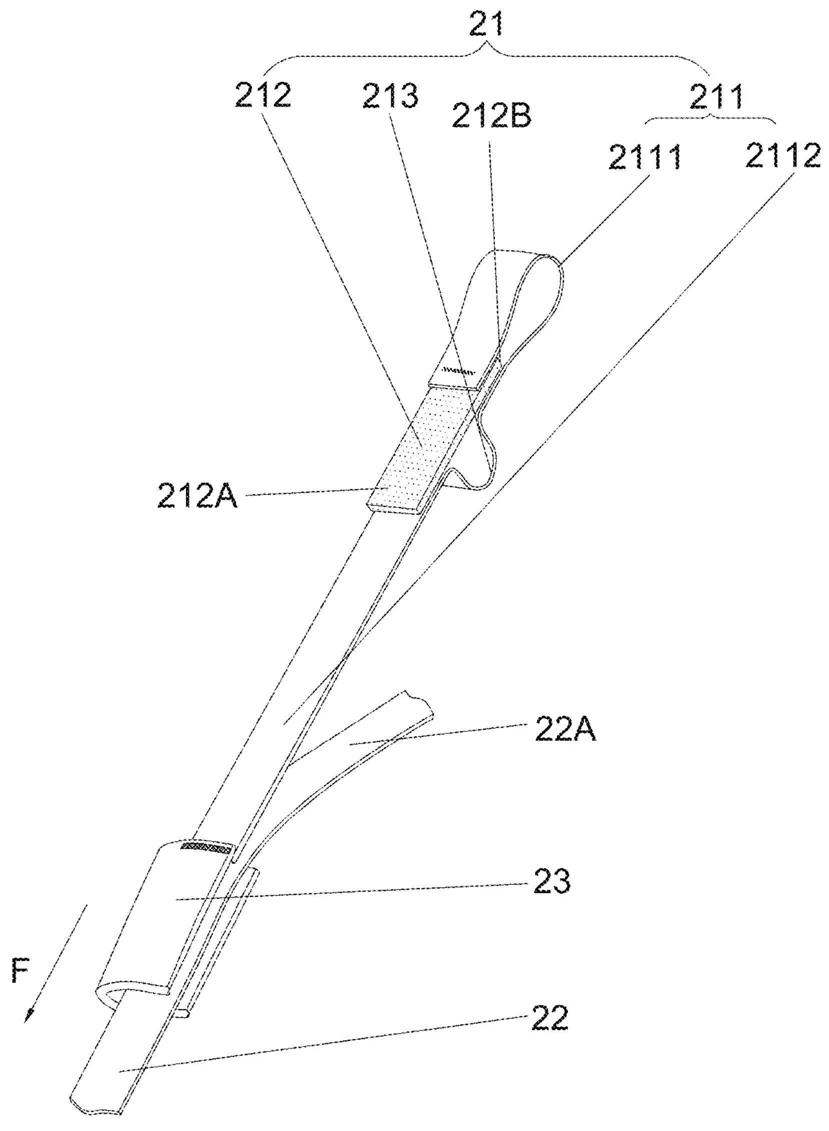
FIG. 2 is a schematic view illustrating a structure of a safety belt and a buffer assembly in the child carrier.

Referring to FIGS. 1 and 2, the safety belt system 200 comprises the buffer assembly 21 and the safety belt 22. The safety belt 22 is, e.g., a shoulder strap. A first end 22A of the safety belt 22 is connected to the carrier body 100. More specifically, the first end 22A of the safety belt 22 can be connected to an upper portion of the backrest portion 11 or the headrest portion 12. A second end 22B of the safety belt 22 can be releasably connected to a buckle 131 provided on the seat portion 13, whereby the safety belt 22 can extend around the child's body in use and operate to restrain the child sitting in the carrier body 100 responsive to the child carrier 1 being subjected to an impact or sudden deceleration.

Moreover, the safety belt 22 can have a slidable protective piece 23 that can provide comfort and cushioning to the child. In at least some embodiments, the protective piece 23 has a flexible structure and can increase a contact area of the safety belt 22 with a shoulder of the child, which can dissipate stress and improve comfort. According to an embodiment, the protective piece 23 has a wrapping structure that can be opened and closed for quick and convenient installation of the protective piece 23 around the safety belt 22. For example, the protective piece 23 can be opened and closed by using hook and loop fasteners.

Referring to FIGS. 1 and 2, the buffer assembly 21 is connected to the safety belt 22 and the carrier body 100. More specifically, the buffer assembly 21 can be connected to the carrier body 100 and the safety belt 22 at two opposite ends, the buffer assembly 21 being connected to the safety belt 22 at a location between the first end 22A and the second end 22B of the safety belt 22. According to an embodiment, the buffer assembly 21 comprises a connecting strap 211. One end of the connecting strap 211 forms a first anchoring end 2111 adapted to connect to the carrier body 100, and another end of the connecting strap 211 forms a second anchoring end 2112 adapted to connect to the safety belt 22. The first anchoring end 2111 of the connecting strap 211 is connected to the carrier body 100, wherein the carrier body 100 may, for example, be provided with an anchor structure for connection of the first anchoring end 2111 of the connecting strap 211.

According to an embodiment, the first anchoring end 2111 of the connecting strap 211 can be connected to the headrest portion 12 of the carrier body 100. For example, the anchor structure includes a positioning bar 121 affixed to the headrest portion 12, the first anchoring end 2111 can form a loop, and the positioning bar 12 can be disposed through the loop of the first anchoring end 2111 to affix the first anchoring end 2111 to the headrest portion 12. Accordingly, the first anchoring end 2111 can be adjusted in height by moving the headrest portion 12 and the positioning bar 121, which allows adjustment of the height of the connecting strap 211 as desired in accordance with the child's body height. During installation, the first anchoring end 2111 of the connecting strap 211 is connected to the positioning bar 121 of the carrier body 100, and the second anchoring end 2112 of the connecting strap 211 is connected to the safety belt 22 between the first end 22A and the second end 22B thereof.

According to an embodiment, the buffer assembly 21 is slidably connected to the safety belt 22. For example, the second anchoring end 2112 of the connecting strap 211 can be affixed to the protective piece 23 on the safety belt 22. As the protective piece 23 can slide along the safety belt 22, a sliding connection can be achieved between the second anchoring end 2112 of the connecting strap 211 and the safety belt 22, the second anchoring end 2112 of the connecting strap 211 and the protective piece 23 being slidable in unison relative to the safety belt 22. Through the connection of the first and second anchoring ends 2111 and 2112, the connecting strap 211 can be tensioned or loosened.

Figure 3:
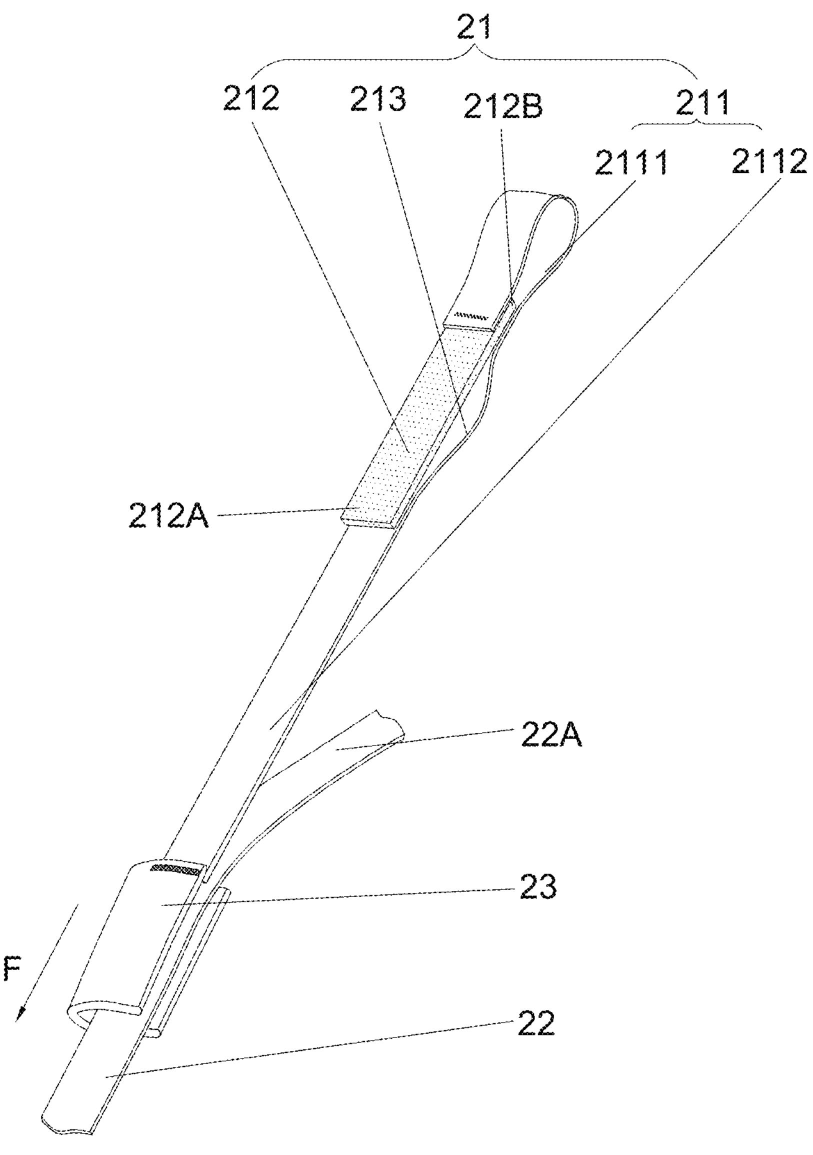
FIG. 3 is a schematic view illustrating a buffering part of the buffer assembly of FIG. 2 in a stretched state.
Figure 4:
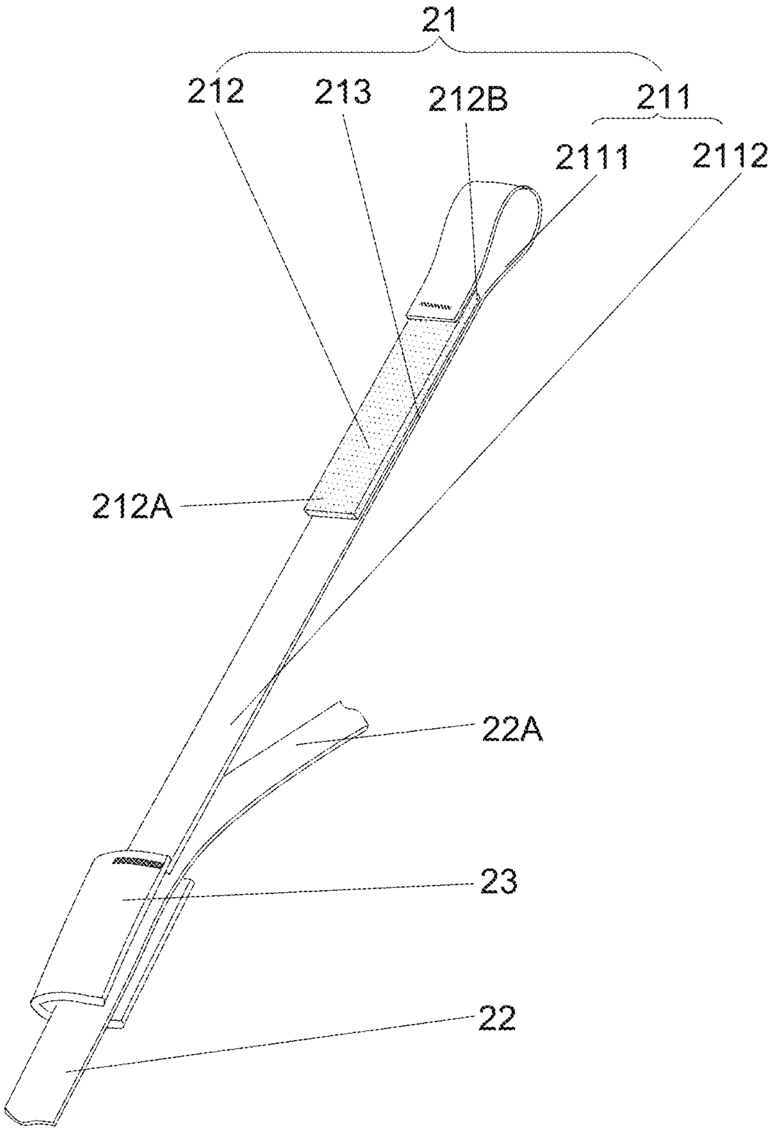
FIG. 4 is a schematic view illustrating a restricting section of the buffer assembly in a fully extended state.

For better understanding the construction of the safety belt 22, the connecting strap 211 and the protective piece 23, the protective piece 23 is shown in FIGS. 2-4 as a wrapping structure in a partially opened state, and the safety belt 22 and the connecting strap 211 intersecting at the protective piece 23 form a Y-shaped structure. The Y-shaped structure can be connected to the carrier body 100 at two different locations, wherein one of the two locations is where the first anchoring end 2111 of the connecting strap 211 connects to the anchor structure of the carrier body 100 (i.e., the location where the first anchoring end 2111 connects to the positioning bar 121 on the headrest portion 12), and the other location is where the first end 22A of the safety belt 22 connects to the upper portion of the backrest portion 11 or the headrest portion 12. The two connecting locations are arranged so that the safety belt 22 can provide a suitable restraining force for protecting the child. In this embodiment, the first anchoring end 2111 of the connecting strap 211 and the first end 22A of the safety belt 22 are each connected to the carrier body 100 at two different locations, whereby the location where the buffer assembly 21 connects to the carrier body 100 differs from the location where the safety belt 22 connects to the carrier body 100. More specifically, the location where the buffer assembly 21 connects to the carrier body 100 can be higher in elevation than the location where the safety belt 22 connects to the carrier body 100, i.e., the location where the first anchoring end 2111 of the connecting strap 211 connects to the carrier body 100 is higher in elevation than the location where the first end 22A of the safety belt 22 connects to the carrier body 100. In at least some embodiments, the elevation is determined with respect to a base of the child carrier 1. However, the two connections of the first anchoring end 2111 of the connecting strap 211 and the first end 22A of the safety belt 22 to the carrier body 100 are not limited to the aforementioned example and may be disposed at a same location or at adjacent locations. Moreover, all of the two connections can be disposed on the connecting structure of the backrest portion 11 or the headrest portion 12 of the carrier body 100.

Referring again to FIGS. 1-4, the buffer assembly 21 further comprises a deformable buffering part 212 that is connected to the connecting strap 211 and is capable of generating a buffering movement. The buffering part 212 can be connected to the connecting strap 211 between the first anchoring end 2111 and the second anchoring end 2112 thereof. The buffering part 212 is, e.g., an elastic rubber strip having a flat shape. However, the buffering part 212 is not limited to this example and may further comprise a spring structure or an elastic band having a flat shape. Two ends 212A and 212B of the buffering part 212 are each connected to the connecting strap 211 at different locations, and the connecting strap 211 forms a restricting section 213 between the two ends 212A and 212B of the buffering part 212. For example, the two ends 212A and 212B of the buffering part 212 can be affixed to the connecting strap 211 by sewing or an adhesive, and the restricting section 213 can be a portion of the connecting strap 211 extending between the two ends 212A and 212B. Accordingly, the restricting section 213 overlaps with the buffering part 212, and extends from the end 212A of the buffering part 212 to the other end 212B of the buffering part 212.

According to other embodiments, the two ends 212A and 212B of the buffering part 212 can be detachably connected to the connecting strap 211, e.g., through fasteners, adhering parts, fixing retainers and holes engaging one another, hook and loop fasteners, insert fasteners, snap fasteners, or the like. A detachable connection allows the buffering part 212 to be assembled and replaced in a flexible and convenient manner.

According to an embodiment, any of the carrier body 100 and the safety belt 22 is detachably connected to the buffer assembly 21, whereby the buffer assembly 21 can be assembled and detached in a flexible and convenient way. For example, the first anchoring end 2111 of the connecting strap 211 can be connected to the carrier body 100 through fasteners, fixing retainers and holes engaging one another, or like detachable systems. The second anchoring end 2112 of the connecting strap 211 can also be connected to the safety belt 22 through fasteners, fixing retainers and holes engaging one another, or like detachable systems.

With the buffer assembly 21, the protective piece 23 can drive the second anchoring end 2112 of the connecting strap 211 to slide in a direction F (shown in FIGS. 2 and 3) away from the backrest portion 11, which causes a portion of the connecting strap 211 between the protective piece 23 and the buffering part 212 to tighten and the buffering part 212 to deform and stretch, thereby creating a buffering movement. In at least one embodiment, the buffer assembly 21 can be installed at two sides of one side of the safety belt 22.

Reference is made hereinafter to FIGS. 1-4 for describing a buffering effect occurring in the child carrier 1 responsive to the child carrier 1 being subjected to an impact or sudden deceleration. Referring to FIGS. 1 and 2, when the child carrier 1 is in a normal use configuration, the buffering part 212 of the buffer assembly 21 is in the configuration shown in FIG. 2, and the restricting section 213 has a wrinkle. The safety belt 22 and the connecting strap 211 restricts the child in the carrier body 100, which can prevent the child from being ejected away from the carrier body 100. Moreover, since the first and second anchoring ends 2111 and 2112 of the connecting strap 211 are respectively connected to the positioning bar 121 and the protective piece 23, the protective piece 23 rests tightly close to the child's body and the connecting strap 211 is in a tightened state.

Referring to FIGS. 1 and 3, when the child carrier 1 is subjected to an impact or sudden deceleration, the child inside the child carrier 1 may be displaced forward owing to inertia and drives the protective piece 23 to slide along the safety belt 22, which imparts a buffering movement in the buffer assembly 21 connected to the protective piece 23. In particular, the buffering part 212 of the buffer assembly 21 can be stretched and deformed so as to absorb a portion of the energy of the impact or sudden deceleration, thereby preventing the safety belt 22 from applying an excessive restraining or pulling force on the child. Accordingly, better protection is provided for the child. Because the connecting strap 211 has no elasticity or a relatively lower elasticity, stretching the buffering part 212 causes the restricting section 213 of the connecting strap 211 to be extended owing to the deformation of the buffering part 212, but the restricting section 213 would not be fully extended and thus would not be tightened.

Referring to FIG. 4, when the child carrier 1 is subjected to a stronger impact or a sudden deceleration of a greater magnitude, the buffering part 212 of the buffer assembly 21 may be deformed and stretched to a maximal length. Because the connecting strap 211 has no elasticity or a relatively lower elasticity, the restricting section 213 of the connecting strap 211 is fully extended owing to the extension of the buffering part 212 to the maximal length. At this time, the connecting strap 211 can directly restrain the child and prevent the child from being ejected in case the buffering part 212 breaks due to an excessive impact force. Moreover, the restricting section 213 protects the ability of the buffering part 212 to deform and recover, which ensures that the safety belt system can be used multiple times in a normal condition of use.

Figure 6:
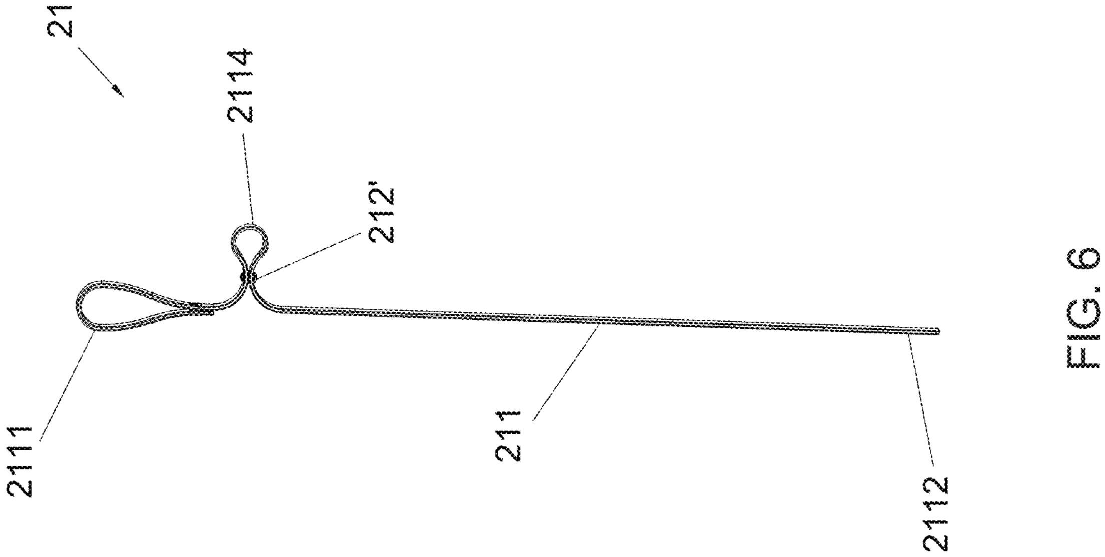
FIG. 6 is a side view illustrating the buffer assembly of FIG. 5.
Figure 5:
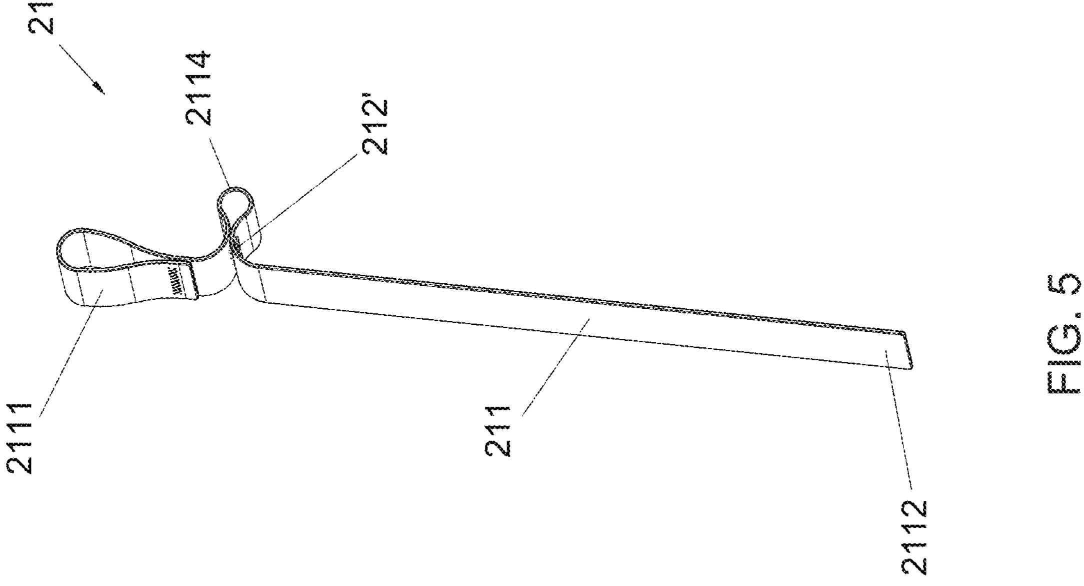
FIG. 5 is a perspective view illustrating another embodiment of a buffer assembly.

In conjunction with FIG. 1, FIGS. 5 and 6 illustrate another embodiment of the buffer assembly 21. Referring to FIGS. 1, 5 and 6, the buffer assembly 21 is connected to both the carrier body 100 and the safety belt 22 as previously described. More specifically, the buffer assembly 21 shown in FIGS. 5 and 6 comprises a connecting strap 211. The first anchoring end 2111 of the connecting strap 211 can be connected to the carrier body 100, and the second anchoring end 2112 of the connecting strap 211 can be connected to the safety belt 22 between the first end 22A and the second end 22B thereof. For example, the first anchoring end 2111 of the connecting strap 211 can form a loop and connect to the headrest portion 12 (shown in FIG. 1), and the second anchoring end 2112 of the connecting strap 211 can connect to the protective piece 23 (shown in FIG. 1) on the safety belt 22. Moreover, an intermediate portion 2114 of the connecting strap 211 between the first anchoring end 2111 and the second anchoring end 2112 is affixed to a buffering part 212'. For example, the intermediate portion 2114 can be folded to form a loop, and two folded ends are joined together with the buffering part 212' to close the loop, which thereby holds the loop of the intermediate portion 2114. The buffering part 212' can break upon application of a sufficient force by the connecting strap 211, which opens the loop of the intermediate portion 2114 and consequently generates a buffering effect. According to an embodiment, the buffering part 212' is a sewing thread. However, the buffering part 212' is not limited to this example, and may be a clipping element, an adhering material, or the like.

Referring to FIGS. 1, 5 and 6, when the child carrier 1 is subjected to an impact or sudden deceleration, the child inside the child carrier 1 may be displaced forward owing to the action of inertia and drives the protective piece 23 to slide along the safety belt 22, which imparts a buffering movement in the buffer assembly 21 connected to the protective piece 23. In particular, the connecting strap 211 of the buffer assembly 21 would be stretched causing the buffering part 212' to break, whereby a portion of the energy of the impact or sudden deceleration is absorbed and the safety belt 22 is prevented from applying an excessive restraining or pulling force on the child. Accordingly, better protection is provided for the child.

An advantage of the child carrier and the buffer assembly according to at least one embodiment of the present invention is the ability for the buffer assembly, which is connected to the safety belt, to generate a buffering movement owing to inertia when the child carrier is subjected to an impact or sudden deceleration, whereby a portion of the energy of the impact or sudden deceleration is absorbed and the safety belt is prevented from applying an excessive restraining or pulling force on the child, which offers better protection for the child.

The foregoing description of selected embodiments of the present invention is meant to be illustrative and not limiting. Accordingly, equivalent modifications made according to the claims still fall within the scope of the present invention.

The invention claimed is:

1. A child carrier comprising:

a carrier body suitable for carrying a child, the carrier body comprising a seat portion, and a backrest portion extending away from the seat portion;

a safety belt having a first end connected to the carrier body and a second end connectible to a buckle, the safety belt extending continuously between the first end and the second end; and a buffer assembly having a first anchoring end connected to the carrier body and a second anchoring end connected to the safety belt between the first end and the second end thereof, wherein the safety belt extends downward from the first end to the second anchoring end and extends downward from the second anchoring end to the second end, wherein the buffer assembly is configured to stretch and generate a buffering movement responsive to the child carrier being subjected to an impact or sudden deceleration, wherein the location where the second anchoring end of the buffer assembly connects to the safety belt is closer to the seat portion of the carrier body than a location at which the first end of the safety belt is connected to the carrier body.

2. The child carrier according to claim 1, wherein the location where the first anchoring end of the buffer assembly connects to the carrier body differs from a location where the safety belt connects to the carrier body.

3. The child carrier according to claim 1, wherein the location where the first anchoring end of the buffer assembly connects to the carrier body is higher than a location where the safety belt connects to the carrier body.

4. The child carrier according to claim 1, wherein the carrier body has a headrest portion, and the buffer assembly is connected to the headrest portion.

5. The child carrier according to claim 1, wherein the buffer assembly is slidably connected to the safety belt.

6. The child carrier according to claim 1, wherein the buffer assembly comprises a buffering part that is able to generate a buffering movement or to break.

7. The child carrier according to claim 6, wherein the buffering part comprises a spring structure or an elastic flat structure, the flat structure being an elastic band or a rubber strip.

8. The child carrier according to claim 6, wherein the buffer assembly further comprises a connecting strap that is connected to the buffering part and the safety belt.

9. The child carrier according to claim 8, wherein the safety belt has a slidable protective piece, and the connecting strap is affixed to the protective piece.

10. The child carrier according to claim 8, wherein one end of the connecting strap forms the first anchoring end of the buffer assembly, which is connected to the carrier body, another end of the connecting strap forms the second anchoring end of the buffer assembly, which is connected to the safety belt, and the buffering part is connected to the connecting strap between the first anchoring end and the second anchoring end thereof.

11. The child carrier according to claim 10, wherein two ends of the buffering part are each connected to the connecting strap at different locations.

12. The child carrier according to claim 10, wherein the connecting strap is folded to form a loop between the first anchoring end and the second anchoring end, the loop being joined to be closed with the buffering part.

13. The child carrier according to claim 12, wherein the buffering part is able to break upon application of a sufficient force by the connecting strap, which opens the loop and generates a buffering effect.

14. The child carrier according to claim 1, wherein any of the carrier body and the safety belt is detachably connected to the buffer assembly.

15. The child carrier according to claim 1, wherein the safety belt is a shoulder strap.

16. The child carrier according to claim 1, wherein the carrier body is a child safety seat, an infant stroller, a cradle or a bassinet.

17. The child carrier according to claim 1, wherein the buffer assembly vertically and horizontally overlaps the safety belt.

18. The child carrier according to claim 1, wherein the carrier body further comprises a headrest portion, wherein the backrest portion is between the headrest portion and the seat portion.

19. The child carrier according to claim 18, wherein the first anchoring end of the buffer assembly is connected to the headrest portion of the carrier body and configured to move with the headrest portion relative to the backrest portion.

* * * * *